Mar. 3, 1925. 1,528,332
A. HEMMETER ET AL
AUTOMOBILE LIGHT
Filed March 31, 1920
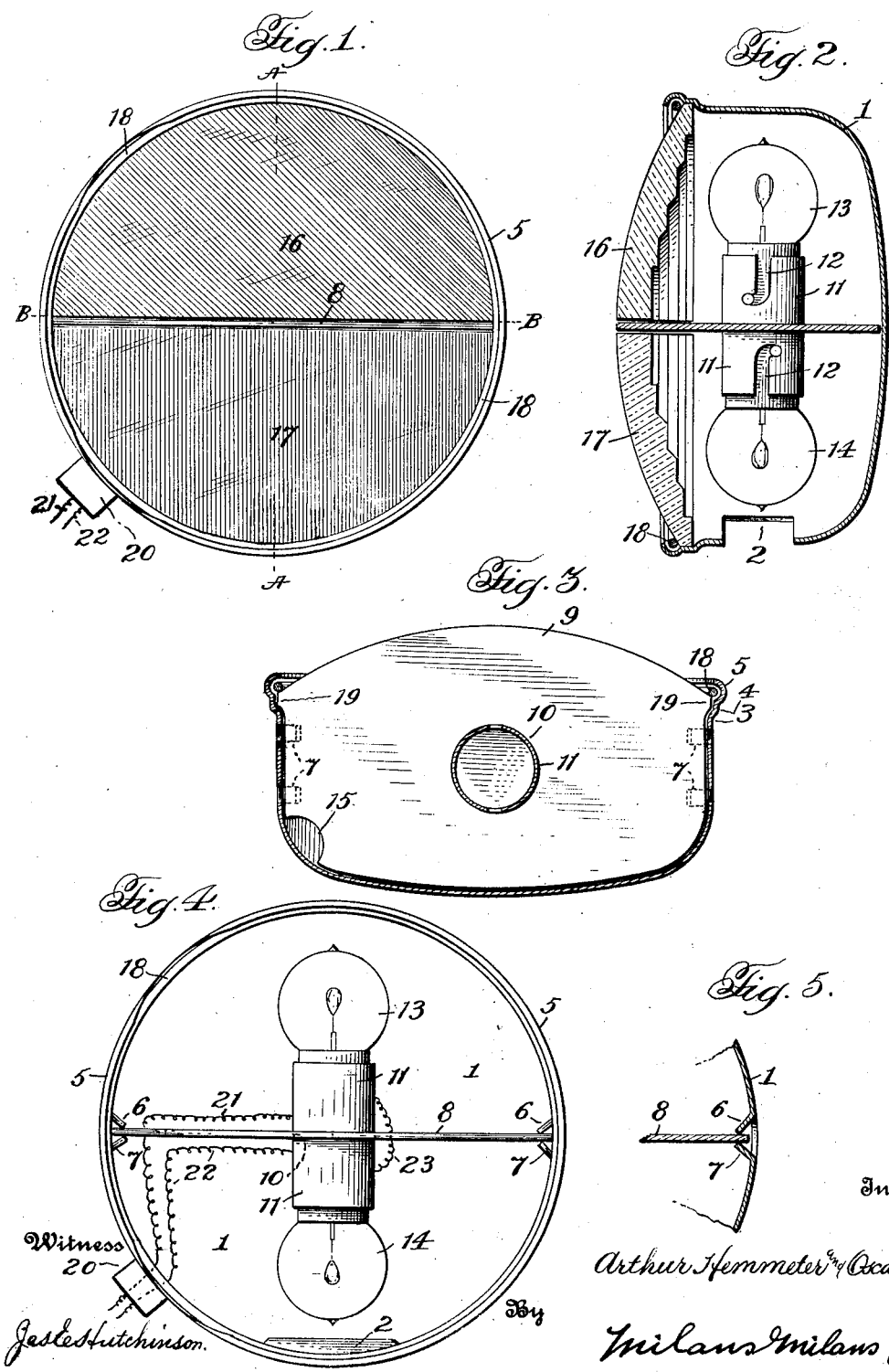

Patented Mar. 3, 1925.

1,528,332

UNITED STATES PATENT OFFICE.

ARTHUR HEMMETER AND OSCAR SOWATSKY, OF SAGINAW, MICHIGAN.

AUTOMOBILE LIGHT.

Application filed March 31, 1920. Serial No. 370,111.

*To all whom it may concern:*

Be it known that we, ARTHUR HEMMETER and OSCAR SOWATSKY, citizens of the United States, residing at Saginaw, in the county of Saginaw and State of Michigan, have invented certain new and useful Improvements in Automobile Lights, of which the following is a specification, reference being had therein to the accompanying drawing.

Our invention relates to automobile lights, and more particularly to a combined tail and signal light.

The principal object of our invention is the provision of a light combining the usual red tail light and a signal light adapted to be operated to indicate that the automobile is to slow down, stop, or turn to the right or left.

Another object consists in the provision of a removable plate carrying the lights, and means for holding said plate in the light casing when the parts are assembled.

A further object resides in providing a sectional lens, each section being of a different color, and means for holding the sections in the light casing.

With these and other objects in view our invention consists in the novel details of construction and arrangement of parts which will be more clearly understood from the following specification and drawings, in which:—

Figure 1 is a front view of the light with parts assembled.

Figure 2 is a transverse vertical section on the line A—A of Figure 1.

Figure 3 is a horizontal view on the line B—B of Figure 1.

Figure 4 is a front view with the lens sections removed.

Figure 5 is a fragmental sectional detail illustrating the supporting lugs for the removable light carrying plate.

In carrying out our invention we provide a casing 1 having an opening 2 in the bottom thereof, said opening being used to throw a light onto the license tag. If desired the opening may be covered with white glass or other suitable transparent material. The forward edge of the casing is flared as shown at 3, and a flange 4 is formed on the edge of the flared portion and terminates into a bead 5. Each side of the casing is slit and lugs 6 and 7 are pressed inwardly from said slit portions. The lugs 6 extend downwardly at an angle, whereas the lugs 7 extend upwardly at an angle. As shown more particularly in Figure 3 there are two pairs of lugs on each side of the casing and one pair is spaced a distance from the other.

A removable plate 8 is slidably supported between the downwardly extending lugs 6 and upwardly extending lugs 7. The forward edge of the plate is curved and swelled as indicated at 9, and as shown more particularly in Figs. 2 and 3 of the drawings this swelled portion extends beyond the outer face of the casing 1 for a purpose to be later described. The plate 8 is also provided with a central opening shown at 10, and a sleeve 11 is adapted to pass through this central opening. The plate 8 will divide the casing into upper and lower compartments, and as shown more particularly in Fig. 2 one end of the sleeve 11 extends into the upper compartment and the opposite end into the lower compartment. A bayonet slot 12 is formed in each end of the sleeve 11 for securing an electric light bulb in each end of the sleeve. The electric light bulb in the upper end of the sleeve is indicated at 13 and the electric light bulb in the lower end of the sleeve is shown at 14. A notch 15 is formed in one end of the plate 8, preferably adjacent the rear edge of the plate, and the purpose of this notch will be later described.

A lens is adapted to be received in the front of the casing 1 and this lens is formed in the sections 16 and 17. The upper section 16 will preferably be colored green, whereas the lower section 17 will preferably be colored red. As shown in Figure 2 of the drawings the outer edge of each section of the lens will engage the inner face of the flange 4. As shown, the lens is concavo-convex in cross section and the lower edge of the upper section 16 will rest upon the top of the plate 8, adjacent the forward edge, and the top of the lower section 17 will engage the under side of the plate 8 adjacent the forward edge thereof.

An expansible ring 18 is adapted to be received in the bead 5 for holding the sections of the lenses in position. As shown the forward movement of the sections will be limited by the flared portion 3 of the casing.

The plate 8 is formed with a projection 19 on each end, adjacent the forward edge, and as shown more particularly in Figure 3 of the drawings, these projections 19, when the plate is in position, will engage the flared portion 3 of the casing and also will be engaged by the ring 18. The ring 18 engaging these projections 19 will hold the plate in proper position within the casing.

A socket 20 may be secured to the casing 1 by soldering or other suitable means, and this socket will receive a plug for connecting the electric supply wires to the light. Wires 21 and 22 lead from the plug in the socket 20, the wire 21 supplying the current to the upper bulb 13 and the wire 22 to the lower bulb 14. The ground wires are indicated at 23. The wire 21 is adapted to be carried through the notch 15, in the plate 8.

By constructing the light as above described, we have provided means for showing a red danger light and have also provided a green signal light for indicating that an automobile is to be slowed down, stopped or turned to the right or left. The bulb 14, in that compartment having the red section of the lens, is adapted to be lighted and will show a red light to the rear of the automobile. A light will also be thrown through the opening 2 of the casing to illuminate the license tag. The bulb 13, in that compartment having the green section of the lens, is adapted to only be lighted when it is desired to signal a pedestrian or automobilist, when it is desired to slow down, stop, or turn to the right or left. The wires 21 and 22 will lead to a suitable switch provided on the steering wheel or instrument board and may be operated when the driver desires. While we preferably leave the light in the lower compartment burning continuously, it will be understood that if desired the switches might be so operated as to extinguish the lower light when the upper light is lighted and to relight said lower light when the upper one is extinguished. When it is desired to gain access to the interior of the light the ring 18 may be removed and the sections 16 and 17 of the lens removed. When this has been done, the plate 8 may be slid from position and will carry the light bulbs therewith.

While we have described our light as primarily used on the rear of an automobile, it will be understood that we might also use one of the lights on the forward end of the automobile to give signal to a traffic officer, or other persons in front of the automobile, that the machine is to be slowed down, stopped, or turned to the right or left.

It will also be understood that the signal light may be used in the day time as well as night, by lighting the bulb in that compartment having the green section of the lens.

Having fully described our invention, what we claim as new and desire to secure by Letters Patent is:—

1. A light comprising a casing, a removable plate mounted in the casing, a projection formed at each end of the plate and extending horizontally therefrom on the same plane, and means engaging the casing and projections for holding the plate in position.

2. A light comprising a casing, a removable plate dividing the casing into compartments, means carried by the plate for illuminating each compartment, a projection formed on each end of the plate, a different colored lens for each compartment, and means carried by the casing and engaging the lens and projections on the plate for holding the plate and lens to the casing.

3. A light comprising a casing, a removable plate received in the casing, said plate provided with a central opening and a notch in one edge, a sleeve extending through the central opening, means carried by the sleeve for illuminating the casing, and means for securing the plate within the casing.

4. A light comprising a casing having an opening in the bottom thereof, lugs struck from each side of the casing and extending inwardly, a plate slidably carried by the lugs, a projection on each end of the plate, a sleeve extending through the plate, illuminating means carried by the sleeve, a sectional lens carried by the casing and each section engaging the plate, and a ring carried by the casing for securing the sections of the lens and plate in position, said ring engaging the projections on the end of the plate.

5. A light comprising a casing, a shoulder formed on the forward edge of the casing, a bead formed adjacent the shoulder, a removable plate dividing the casing into compartments, projections formed on each end of the plate and adapted to engage the shoulder, and a ring carried in the bead and adapted to engage the projections.

6. A light comprising a casing having an open front, a plate dividing the casing into two compartments, a sectional lens for closing the front of the casing, one section engaging on each side of the dividing plate, means carried by the plate for illuminating the compartments, and means common to the lens and plate for securing them in the casing.

7. A light comprising a casing, having an open front, a plate dividing the casing into two compartments, a sectional lens for closing the front of the casing, one section engaging on each side of the dividing plate and the forward edge of the plate being flush with the outer face of the lens, means carried by the plate for illuminating the compartments, and means common to the lens and plate for securing them in the casing.

8. A light comprising a casing having an open front and an internal circumferentially extending groove adjacent the marginal edge thereof, a removable plate received in the casing and dividing the same into compartments, a lens for closing the front of each compartment, and an expansible ring removably received in the groove and engaging the plate and lenses for retaining them in the casing.

In testimony whereof they hereunto affix their signatures in the presence of two witnesses.

ARTHUR HEMMETER.
OSCAR SOWATSKY.

Witnesses:
 E. G. BEACH,
 MARIE W. KAGEL.